(12) United States Patent
Stuber

(10) Patent No.: US 6,868,459 B1
(45) Date of Patent: Mar. 15, 2005

(54) METHODS AND STRUCTURE FOR TRANSFER OF BURST TRANSACTIONS HAVING UNSPECIFIED LENGTH

(75) Inventor: Russell B. Stuber, Boulder, CO (US)

(73) Assignee: LSI Logic Corporation, Milpitas, CA (US)

(*) Notice: Subject to any disclaimer, the term of this patent is extended or adjusted under 35 U.S.C. 154(b) by 335 days.

(21) Appl. No.: 10/037,722

(22) Filed: Oct. 19, 2001

(51) Int. Cl.[7] .............................................. G06F 13/14
(52) U.S. Cl. ....................... 710/35; 710/110; 710/306; 710/307
(58) Field of Search .......................... 710/35, 110, 306, 710/307, 311, 33

(56) References Cited

U.S. PATENT DOCUMENTS

| | | | | |
|---|---|---|---|---|
| 5,255,378 A | * | 10/1993 | Crawford et al. | 710/307 |
| 5,285,421 A | * | 2/1994 | Young et al. | 365/230.04 |
| 5,689,659 A | * | 11/1997 | Tietjen et al. | 710/307 |
| 6,185,637 B1 | * | 2/2001 | Strongin et al. | 710/35 |
| 6,393,500 B1 | * | 5/2002 | Thekkath | 710/35 |

* cited by examiner

Primary Examiner—Kim Huynh
Assistant Examiner—Harold Kim
(74) Attorney, Agent, or Firm—Daniel Fishman

(57) ABSTRACT

Methods and associated structure for providing a substitute, predetermined, fixed length when transferring burst transactions from one device to another through a bridge device where the burst transaction has an indefinite length specified. In one exemplary preferred embodiment, an AMBA AHB bus bridge slave device recognizes initiation of burst transactions of a indefinite length and translates the indefinite length burst transactions on the first bus into appropriate bus transactions for application to a second bus or device having a predetermined fixed length for the transferred the burst transactions. In a second embodiment, a slave device acting as a bridge receives a burst of indefinite length and translates the bus request into one with a predetermined fixed length for application to a device controller. Preferably, the predetermined substitute burst length is configurable within the system to permit optimization of the predetermined fixed length in accordance with the needs of particular buses and devices within the system.

20 Claims, 2 Drawing Sheets

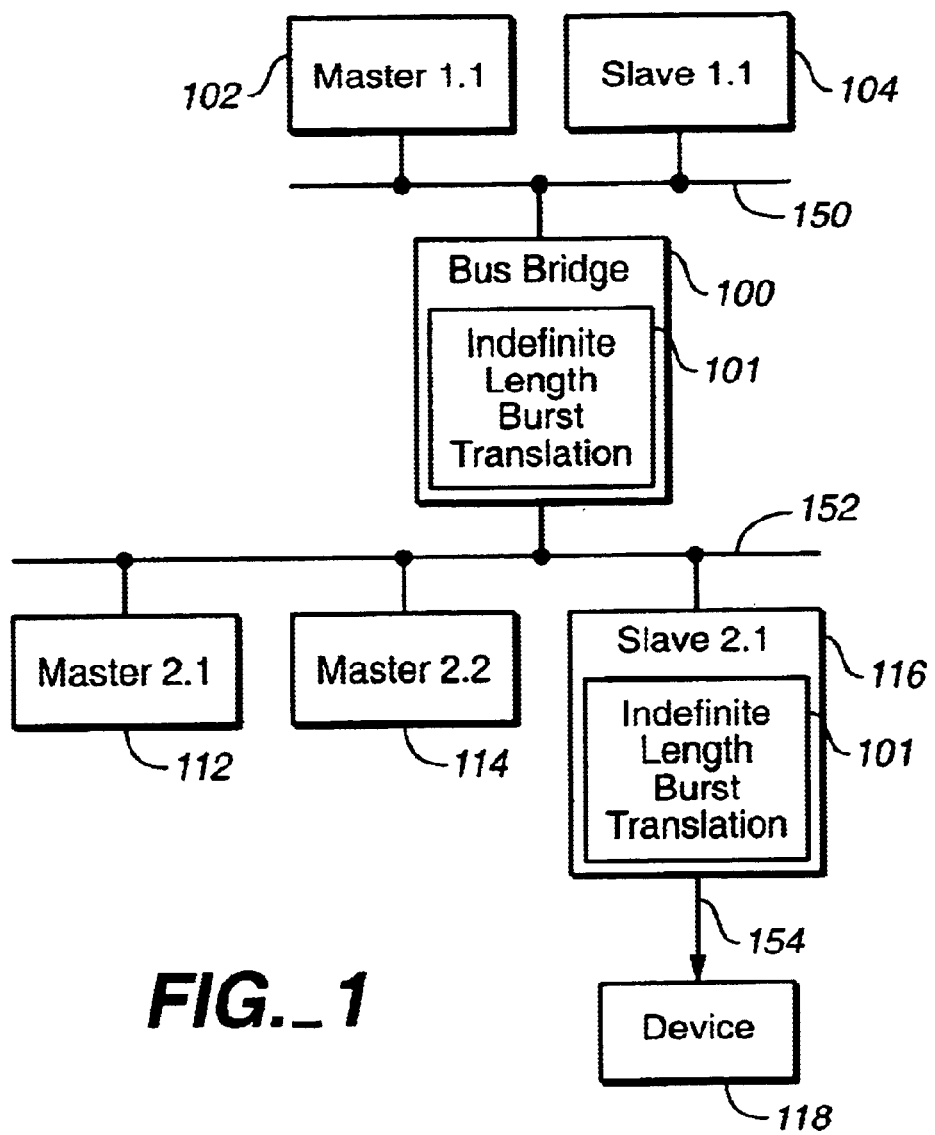
FIG._1

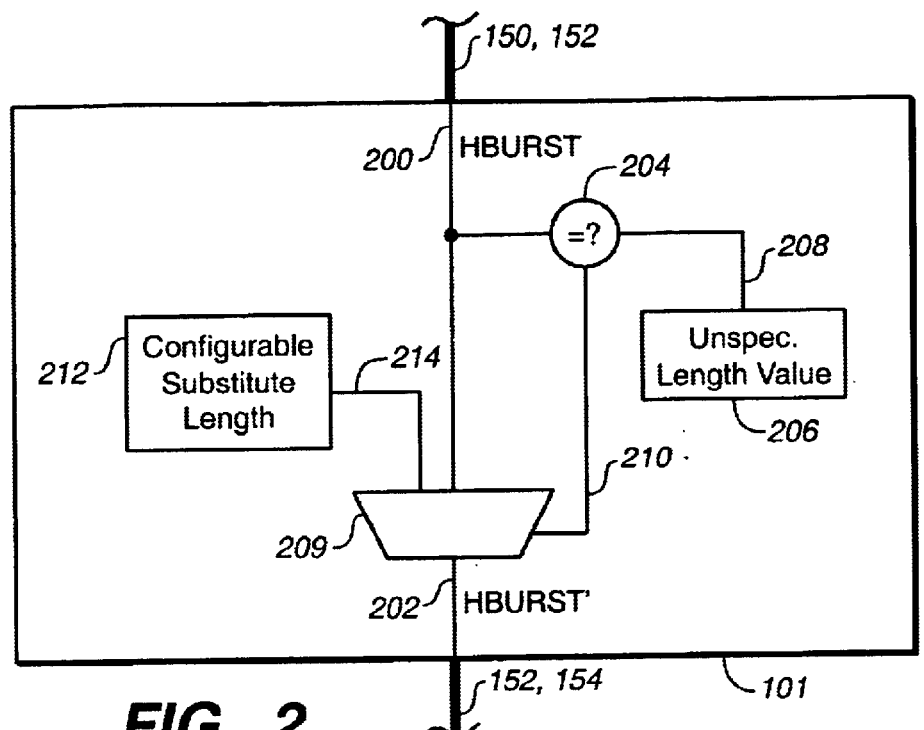
FIG._2
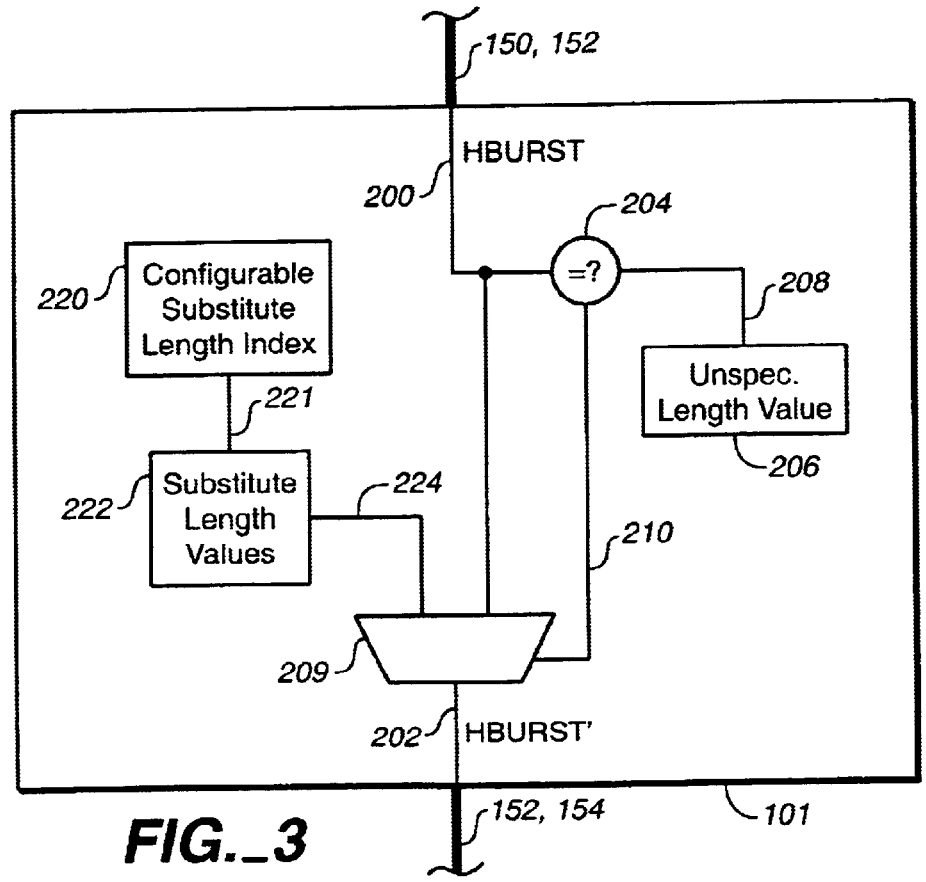
FIG._3

METHODS AND STRUCTURE FOR TRANSFER OF BURST TRANSACTIONS HAVING UNSPECIFIED LENGTH

BACKGROUND OF THE INVENTION

1. The Field of the Invention

The present invention relates to electronic bus transactions as applied to computing systems. More specifically, the present invention relates to methods and associated structure for enabling transfer of burst transactions from a first device to a second device where the burst transactions have an indefinite burst length.

2. Discussion of Related Art

In present electronic computing system designs, it is common for systems to include a bus structure for exchanging information between devices coupled to the bus. More particularly, controlling devices (often referred to as masters or initiators) often transact information with other devices (often referred to as slaves or targets) for purposes of exchanging information. For example, a microprocessor may interact with a memory subsystem for storage and retrieval of data and programmed instructions. Or, for example, a microprocessor or DMA controller may initiate bus transactions to transmit or receive information to, or from, an I/O controller coupled to the bus.

Is also generally known in such electronic systems that burst transactions on the bus improve overall system performance. A burst transactions is one in which, after acquiring control of the bus, a master device initiates a transaction where multiple units of data are transferred in rapid succession during one transaction process on the bus. In other words, rather than each transaction transferring a single unit of data between a first and second device, a burst transaction acquires the bus and transfers a plurality of units of data during the duration of the single burst bus transactions.

Typically, as presently practiced in the art, a burst transaction has some predefined length measured in units of data. The initiating device on the bus acquires control of the bus and applies signals to the bus indicating the predetermined length of the burst transaction. Present systems also provide for burst transactions having any indefinite length. In other words, a master device acquires the bus and provides a burst transaction having no predetermined length. Rather, other signals on the bus are used to indicate termination of the burst transaction.

It is common in the art to utilize bus bridge devices that couple data signals from one bus to another bus. In such environments, it is common to transfer the burst transaction first to the bus bridge device (functioning as a slave or target device) and then forwarding the burst transaction through the bus bridge (acting as a master or initiator on the second bus) to the second bus for processing by an identified slave device.

Devices other than bus bridges may need to forward signals from a device on a first bus to signals on a second bus. For example, a slave device on a first bus may receive signals from a master device on that first bus and forward the signals to a device controller (i.e., I/O device controller) over a second bus unique to the device architecture. Or, for example, a memory controller device may receive signals on a first bus from a master device (i.e., a CPU or DMA controller) and translate and forward those signals to a different bus structure used to control memory devices. In such cases, a burst bus transaction on the first bus must be translated in some manner to corresponding burst transactions on the second bus structure.

As used herein, "bridge" refers to any such devices that adapt signals received on a first bus to signals applied or forwarded by the bridge to a second bus. Such devices include circuits commonly referred to as "bus bridges" but may also include other similar devices as noted above.

Transfer of a burst transaction from one device to another device for further processing is easily performed where the burst transaction has a predetermined length. Information regarding the burst transaction including the predetermined length is simply transferred between devices and the receiving device can process the transaction as required (i.e., forward the transaction on a second bus to an intended target or slave device). However, where a burst transaction has no predetermined length but rather has an indefinite length, problems arise in attempting to transfer the transaction to another device. In particular, it is problematic to transfer such a burst transaction through a bus bridge device or other devices that couple and adapt signals between a first bus and a second bus.

Exemplary of an environment giving rise to this problem is an AMBA AHB bus architecture system. It is common in such architectures to include a bus bridge device to adapt the high-performance AHB bus signals to lower speed buses used for transacting with I/O peripheral devices. Or a first AHB bus may be bridged to a second AHB bus such that the two buses generally avoid contention problems but may access devices on either bus. It is therefore a problem in such an AMBA bus environment to transfer burst transactions of indefinite length through a bus bridge device.

Another exemplary environment giving rise to these problems is a slave device coupled to a first bus (such as an AMBA AHB bus) that receives signals intended for a device controller coupled to the slave device. The slave device, much as a bus bridge functions, converts and forwards those signals to the device controller on a second bus adapted specifically for transactions involving the device.

It is evident from the above discussion that a need exists for an improved architecture to permit transfer of indefinite length burst transactions between devices on a high-performance system.

SUMMARY OF THE INVENTION

The present invention solves the above and other problems, thereby advancing the state of the useful arts, by providing methods and associated structure for translating burst transactions of indefinite length into the burst transactions having a default, predetermined, fixed length for transfer of the transaction over a bridge. More specifically, as applied in the AMBA AHB environment, the present invention provides for detecting within a slave device (a "bridge" as the term is used herein) the initiation of a burst transaction on the AHB bus having an indefinite length. In accordance with the present invention, the "bridge" then translates the bus transaction to provide a default, predetermined, fixed length for the burst transaction when transferring the transaction to another device (i.e., a device controller) on a second bus. The default, predetermined, fixed length is configurable to allow for a variety of default fixed lengths in transferred transactions. Preferably, the configurable, predetermined, fixed length is tuned to the types of transactions expected in a particular application in accordance with a particular bus or device of the system application.

More specifically, a first preferred embodiment of the invention provides for a bus bridge device for transfer of indefinite length burst transactions from a first bus to a second bus via the bus bridge device, the bus bridge device comprising: a detector circuit to detect initiation of a burst transaction on the first bus wherein the burst transaction has an indefinite length; and a translator circuit to translate the burst transaction to a new burst transaction having a predetermined length.

Another embodiment further provides for a configuration register within the bus bridge device to store a configuration value indicative of the predetermined length.

An associated method of the invention operable within such a bus bridge device provides detecting initiation of a burst transaction on the first bus wherein the burst transaction has an indefinite length; and translating the burst transaction to a new burst transaction having a predetermined length.

Another embodiment of the method further provides for storing a configuration value in a configuration register wherein the configuration value is indicative of the predetermined length.

Still another preferred embodiment provides for a slave device for transfer of indefinite length burst transactions received from a master device on a first bus to a device controller on a second bus via the slave device, the slave device comprising: a detector circuit to detect initiation of a burst transaction on the first bus wherein the burst transaction has an indefinite length; and a translator circuit to translate the burst transaction to a new burst transaction having a predetermined length.

A further embodiment provides for a configuration register within the slave device to store a configuration value indicative of the predetermined length.

Yet another embodiment provides method operable in a slave device provides for detecting initiation of a burst transaction on the first bus wherein the burst transaction has an indefinite length; and translating the burst transaction to a new burst transaction having a predetermined length.

Another embodiment of this method provides further for storing a configuration value in a configuration register wherein the configuration value is indicative of the predetermined length.

BRIEF DESCRIPTION OF THE DRAWINGS

FIG. 1 is a block diagram of a typical system in which the features of the present invention may be advantageously applied with a bridge such as a bus bridge device or a slave device coupled to a device controller.

FIG. 2 is a block diagram of a first embodiment of the present invention where an indefinite length burst is translated to a fixed length burst.

FIG. 3 is a block diagram of a second embodiment of the present invention where an indefinite length burst is translated to a fixed length burst with a configuration register used to dynamically determine the desired predetermined length.

DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram depicting a typical system in which the features of the present invention may be advantageously applied. Master device 102 and a slave device 104 are coupled to a first bus 150. Transactions among these devices (102 and 104) are performed without interaction with bus bridge device 100. Bus bridge device 100 of FIG. 1 will be understood to be one example of a "bridge" as the term is used herein—i.e., a device that translates and forwards signals between two bus structures. Master devices 112 and 114 as well as slave device 116 are coupled to a second bus 152. Bus transactions among these devices (112, 114 and 116) are also performed without interaction with bus bridge device 100. Bus bridge device 100 couples first bus 150 to second bus 152 to permit bus transactions between devices on different buses. For example, master device 102 may perform transactions directed to slave device 116 via bus bridge device 100. Similarly, master devices 112 and 114 may direct transactions through bus bridge device 100 to slave device 104.

As noted above, transactions directed through a bus bridge device of a fixed length or a fixed burst length may be easily transferred by the bus bridge device because the number of units of data to be transferred is well-defined. Problems noted above arise where a first device issues a burst transaction of unspecified length directed to a slave device through a bus bridge device. For example, if master 112 directs an unspecified length bus burst transaction through bus bridge 100 to slave device 104, bus bridge 100 cannot determine the number of units of data to be transferred by the burst transaction. In general, bus bridge 100 operates as a slave device in receiving the original transactions from master 112 and then transfers the transactions, acting as a master device, directing the transactions over another bus to slave device 104.

Those skilled in the art will also recognize that similar problems can arise where any single device (though not necessarily a "bus bridge" between two buses) acts to forward bus transactions to another device. For example, slave device 116 on second bus 152 could receive a transaction intended for processing by a device controller 118 coupled to slave device 116 via bus 154. In such a circumstance, slave 116 acts as a "bridge" device (as the term is used herein) in that it translates and forward signals from bus 152 to another bus structure—namely bus 154. In such a circumstance, the slave 116 acts in a manner essentially identical to a bus bridge device and therefore encounters similar problems to that described above with regard to bus bridge device 100.

To resolve these problems, indefinite length burst translation element 101 within both bus bridge device 100 and slave device 116 embodies the features of the present invention. Methods and structures of the present invention within element 101 are therefore beneficially applied to the system of FIG. 1 to simplify transfer of burst transactions of unspecified length between a first device at a second device through an intermediate device. In particular, in a preferred exemplary embodiment, methods and structures of the present invention are implemented within the bus bridge 100 to simplify transfer of unspecified length burst transactions between devices coupled to first bus 150 and devices coupled to second bus 152. Further, in another preferred embodiment, the present invention is embodied within slave device 116 to translate and forward indefinite length bursts to a device controller 118 via a device specific bus 154.

More specifically, in an exemplary preferred embodiment, bus 150 and 152 are AMBA AHB compliant buses and bus bridge 100 transfers bus transactions between two AHB buses (150 and 152). In another preferred exemplary embodiment, bus 150 is an AMBA AHB compliant bus and bus 152 is an AMBA APB compliant bus for coupling to lower speed I/O peripheral devices. In such an embodiment, bus bridge device 100 transfers transactions generated on AHB bus 150 to slave devices on APB bus 152. In still another preferred embodiment, bus 152 is an AMBA AHB bus and bus 154 is a bus unique to a particular I/O device controller. In this embodiment, slave device 116 serves as a "bridge" to translate burst transactions between AHB bus 152 and device specific bus 154.

FIG. 2 is a block diagram providing additional details of features of the present invention element 101 within bus bridge 100 and slave device 116 (each referred to herein as a "bridge"). Those skilled in the art will readily recognize that element 101 of FIG. 2 depicted as within bus bridge device 100 or slave device 116 comprises a small fraction of the total functionality and logic of those devices. Only those portions relevant to features of the present invention are depicted in the elements of FIG. 2.

In general, bus indefinite length burst translation 101 of the present invention receives a burst length parameter (HBURST 200) from first bus 150 or 152, generates a modified burst length parameter (HBURST 202) and applies the modified burst length parameter to second bus 152 or 154. If the burst length parameter received specifies a fixed burst length that received parameter value is passed through unchanged as the modified burst length parameter. If the received burst length parameter indicates an unspecified burst length value element 101 modifies the burst length parameter by providing a substitute burst length value in accordance with configurable options associated with the bridge device (100 or 116).

Specifically, HBURST 200 (the received burst length parameter) is applied as a first input to mux 209. The output signal generated by mux 209 is HBURST 202. Received burst length parameter HBURST 200 is also applied as a first input to comparator 204. The second input to comparator 204 is a value that indicates an unspecified length value represented as element 206 and applied to comparator 204 via path 208. Comparator 204 determines whether the received burst length parameter is equal to an unspecified length value and applies the comparison Boolean output to path 210 as the selection input to mux 209. The second input to mux 209 is a configurable substitute length value 212 applied via path 214 to mux 209. If comparator 204 determines that the received burst length parameter HBURST 200 is equal to an unspecified length value as represented by element 206, it generates a signal applied to selection input 210 of mux 209 to select the configurable substitute length value 212 applied to path 214 as an input to mux 209. If comparator 204 determines that the received burst length parameter HBURST 200 is not an unspecified length value, a signal is applied to selection input path 210 of mux 209 to select the received burst length parameter. The selected value is then applied by mux 209 as output signal HBURST' 202.

Configurable substitute length value 212 is preferably a fixed length indicating a fixed, predetermined, substitute burst length for the transferred transaction.

FIG. 3 provides similar details of features of the present invention element 101 within bus bridge device 100 or slave device 116 to modify the received burst length parameter when the received burst length parameter indicates an unspecified burst length value. Elements 200 through 210 are operable as described above with respect to FIG. 2. FIG. 3 provides a second preferred exemplary embodiment of the present invention—a variation of FIG. 2 in that the substitute burst length value is configurable. A configurable setting permits selection of any of a plurality of substitute burst length values. A substitute burst length value is selected by a configurable index value 220 applied via the path 221 to an array of substitute length values 222. The array of substitute values 222, in turn, applies the selected substitute length value via path 224 as the second input to mux 209. The index value and array of substitute values may also be referred to herein as a "lookup table." A designer or user in a particular system application of translation element 101 may dynamically modify the selection of a preferred substitute burst length parameter value by changing the index setting in element 220. For example, it may be desirable to modify the substitute burst length value in accordance with the intended target/slave device to which the burst transaction is transferred. In such an exemplary embodiment, the slave ID may be used, for example, as the index value 220 to select a preferred substitute burst length parameter value from array 222. Further, those skilled in the art will read readily recognize that array 222 may be implemented as a multiplexer selecting from a variety of predetermined values or as a simple memory device (ROM) storing a plurality of desired substitute burst length parameter values addressed by the applied index value. Such design choices and specifics of implementation are well-known to those of ordinary skill the art.

The table below provides exemplary substitute values in accordance with the three bit burst length encoding field (HBURST) of the AMBA AHB standards. In these exemplary encodings, four possible substitute length values are encoded in a two bit register or jumper selection value 220. The substitute three bit burst encoding value is applied to path 224 for selectable application to path 202 by mux 209.

| Index Value (220) | HBURST Encoding (222) | Substituted Length Value |
|---|---|---|
| 00 | 000 | Single beat transfer |
| 01 | 011 | 4 beat transfer |
| 10 | 101 | 8 beat transfer |
| 11 | 111 | 16 beat transfer |

The above table provides four exemplary substitute length values to provide for fixed, predetermined substitute lengths of 1, 4, 8 and 16. Those skilled in the art will recognize that by expanding the index value size, any number of substitute length values may be selected to provide finer granularity in the length selection. Further, as noted above, the index value may be specified by use of jumpers, switches or a programmable register. These and other design choices are well known to those of ordinary skill in the art.

The following excerpts of HDL code provide further details of an exemplary embodiment of the present invention. As above with respect to FIGS. 2 and 3, only portions of HDL relevant to the features of the present invention are shown in the HDL excerpt. Further, those skilled in the art will readily recognize and understand the listed HDL code segments as representative of any of several dialects of HDL coding language. Lastly, those skilled in the art will recognize the listed HDL segments as designed in association with AMBA AHB bus signal standards. Other bus standards may similarly benefit from the features of the present invention and those skilled in the art will recognize the changes required for application to other bus standards as well-known design choices.

```
// If the hburst type is "Incremental", select an hburst
value // from the irbs file // assign cs_irbs_sel_p=
   (cs_q_hburst_p==3'b001);
// In the case of the irbs being set to a single burst, bit 0
   of // hburst has to be cleared. Otherwise, bit 0 has to be
   set // indicating an incrementing rather than wrapping
   burst. wire cs_single_n;
assign cs_single_n=|cs_q_irbs_p;
wire [2:0] cs_mod_hburst_p;
cs_mod_hburst_p[2:0]=cs_irsb_sel_p ? {cs_q_
   irbs_p[1:0], cs_single_n} : cs_q_hburst_p[2:0];
```

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A bus bridge device for transfer of indefinite length burst transactions from a first bus to a second bus via said bus bridge device, said bus bridge device comprising:

a detector circuit to detect initiation of a burst transaction on said first bus wherein said burst transaction has an indefinite total length; and a translator circuit to translate said burst transaction to a new burst transaction having a predetermined length and to apply the new burst transaction to the second bus.

2. The device of claim 1 further comprising:

a configuration register to store a configuration value indicative of said predetermined length.

3. The device of claim 2 wherein said translator circuit includes:

a lookup table for determining said predetermined length from said configuration value.

4. The device of claim 1 further comprising:

a configuration switch to define a configuration value indicative of said predetermined length.

5. The device of claim 4 wherein said translator circuit includes:

a lookup table for determining said predetermined length from said configuration value.

6. A method operable in a bus bridge device for transfer of indefinite length burst transactions from a first bus to a second bus via said bus bridge device, the method comprising the steps of:

detecting initiation of a burst transaction on said first bus wherein said burst transaction has an indefinite total length;

translating said burst transaction to a new burst transaction having a predetermined length; and applying the new burst transaction to the second bus.

7. The method of claim 6 further comprising:

storing a configuration value in a configuration register wherein said configuration value is indicative of said predetermined length.

8. The method of claim 7 wherein the step of translating includes the step of:

determining said predetermined length using said configuration value and a lookup table indexed by said configuration value.

9. The method of claim 6 further comprising the step of:

setting a switch to define a configuration value indicative of said predetermined length.

10. The method of claim 9 wherein the step of translating includes the step of:

determining said predetermined length using said configuration value and a lookup table indexed by said configuration value.

11. A slave device for transfer of indefinite length burst transactions received from a master device on a first bus to a device controller on a second bus via said slave device, said slave device comprising:

a detector circuit to detect initiation of a burst transaction on said first bus wherein said burst transaction has an indefinite total length; and a translator circuit to translate said burst transaction to a new burst transaction having a predetermined length and to apply the new burst transaction to the second bus.

12. The device of claim 11 further comprising:

a configuration register to store a configuration value indicative of said predetermined length.

13. The device of claim 12 wherein said translator circuit includes:

a lookup table for determining said predetermined length from said configuration value.

14. The device of claim 11 further comprising:

a configuration switch to define a configuration value indicative of said predetermined length.

15. The device of claim 14 wherein said translator circuit includes:

a lookup table for determining said predetermined length from said configuration value.

16. A method operable in a slave device for transfer of indefinite length burst transactions received from a master device on a first bus to a device controller on a second bus via said slave device, the method comprising the steps of:

detecting initiation of a burst transaction on said first bus wherein said burst transaction has an indefinite total length;

translating said burst transaction to a new burst transaction having a predetermined length; and applying the new burst transaction to the second bus.

17. The method of claim 16 further comprising:

storing a configuration value in a configuration register wherein said configuration value is indicative of said predetermined length.

18. The method of claim 17 wherein the step of translating includes the step of:

determining the predetermined length using said configuration value and a lookup table indexed by said configuration value.

19. The method of claim 16 further comprising the step of:

setting a switch to define a configuration value indicative of said predetermined length.

20. The method of claim 19 wherein the step of translating includes the step of:

determining said predetermined length using said configuration value and a lookup table by said configuration value.

* * * * *